Figure 1:
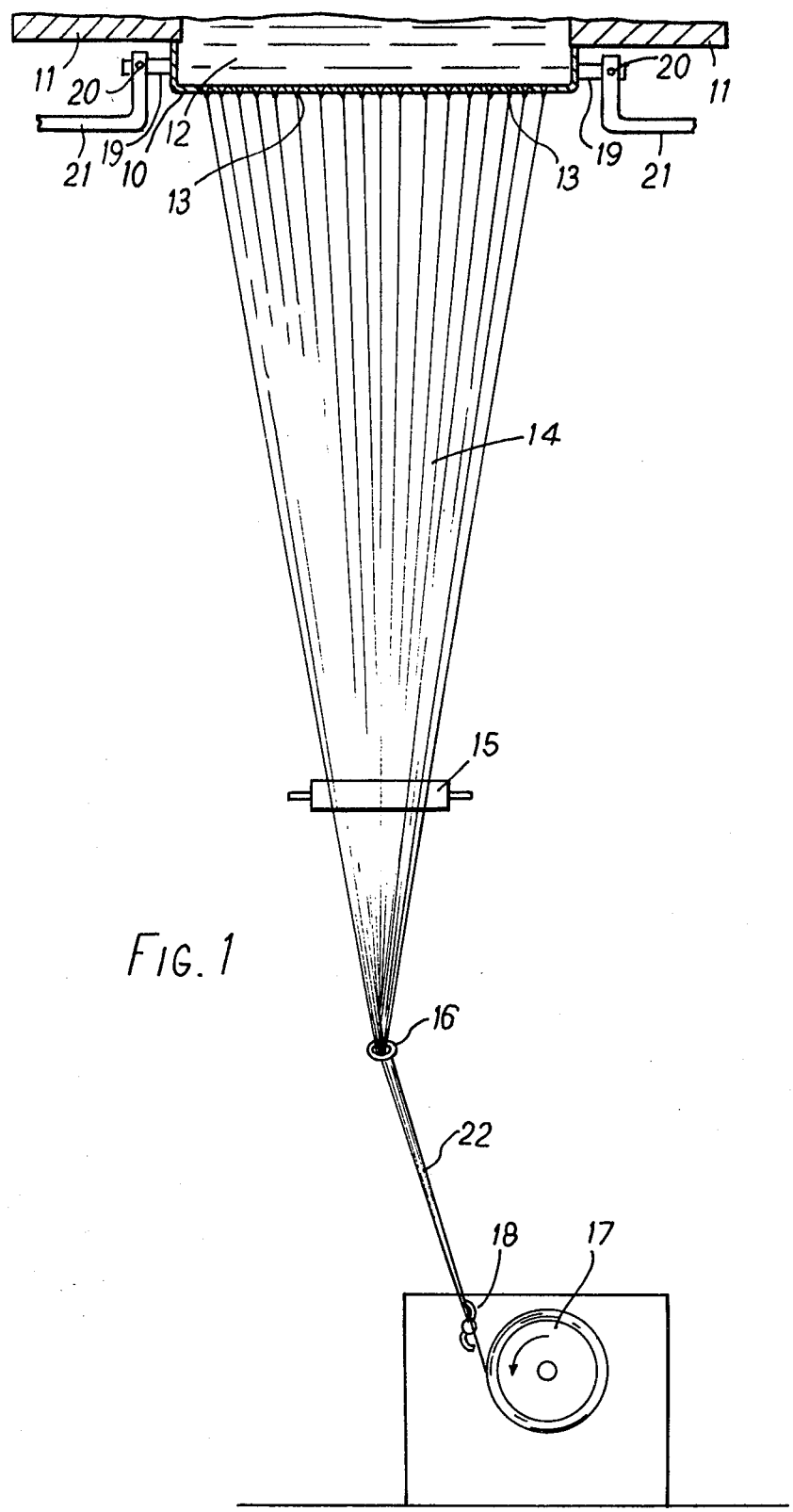

United States Patent [19]

Willis

[11] 4,285,711
[45] Aug. 25, 1981

[54] METHOD AND APPARATUS FOR THE PRODUCTION OF GLASS FIBRES

[76] Inventor: John H. Willis, 501 Drayton Cir., Anderson, S.C. 29621

[21] Appl. No.: 118,883

[22] Filed: Feb. 6, 1980

[51] Int. Cl.³ .......................................... C03B 37/00
[52] U.S. Cl. ................................ 65/1; 13/6; 13/25; 65/2; 65/11 R; 65/DIG. 4
[58] Field of Search ............... 65/1, 2, 11 W, 11 R, 65/134, DIG. 4; 13/6, 25

[56] References Cited

U.S. PATENT DOCUMENTS

| | | | |
|---|---|---|---|
| 2,692,296 | 10/1954 | De Piolenc et al. | 65/1 X |
| 2,794,058 | 5/1957 | Russell | 65/1 X |
| 3,111,550 | 11/1963 | Rushton | 65/DIG. 4 |
| 3,511,916 | 5/1970 | Sinclair et al. | 65/1 X |
| 3,512,948 | 5/1970 | Glaser et al. | 65/1 X |
| 3,837,823 | 9/1974 | Shealy | 65/1 |
| 3,912,477 | 10/1975 | Brady et al. | 65/1 |

FOREIGN PATENT DOCUMENTS 635054  11/1978  U.S.S.R. ............................... 65/1

*Primary Examiner*—Robert L. Lindsay, Jr.
*Attorney, Agent, or Firm*—William A. Drucker

[57] ABSTRACT

Apparatus for producing glass fibres by flowing a plurality of streams of molten glass through an electrically-heated bushing comprising a metal plate having a plurality of orifices therein, together with means for flowing an electric current through said plate to heat it, and the bushing is provided with at least two spaced apart electrical terminals at each end thereof, together with adjustable connector means for each of said terminals, whereby in use, the current flowing through each of said terminals is independently adjustable.

5 Claims, 4 Drawing Figures

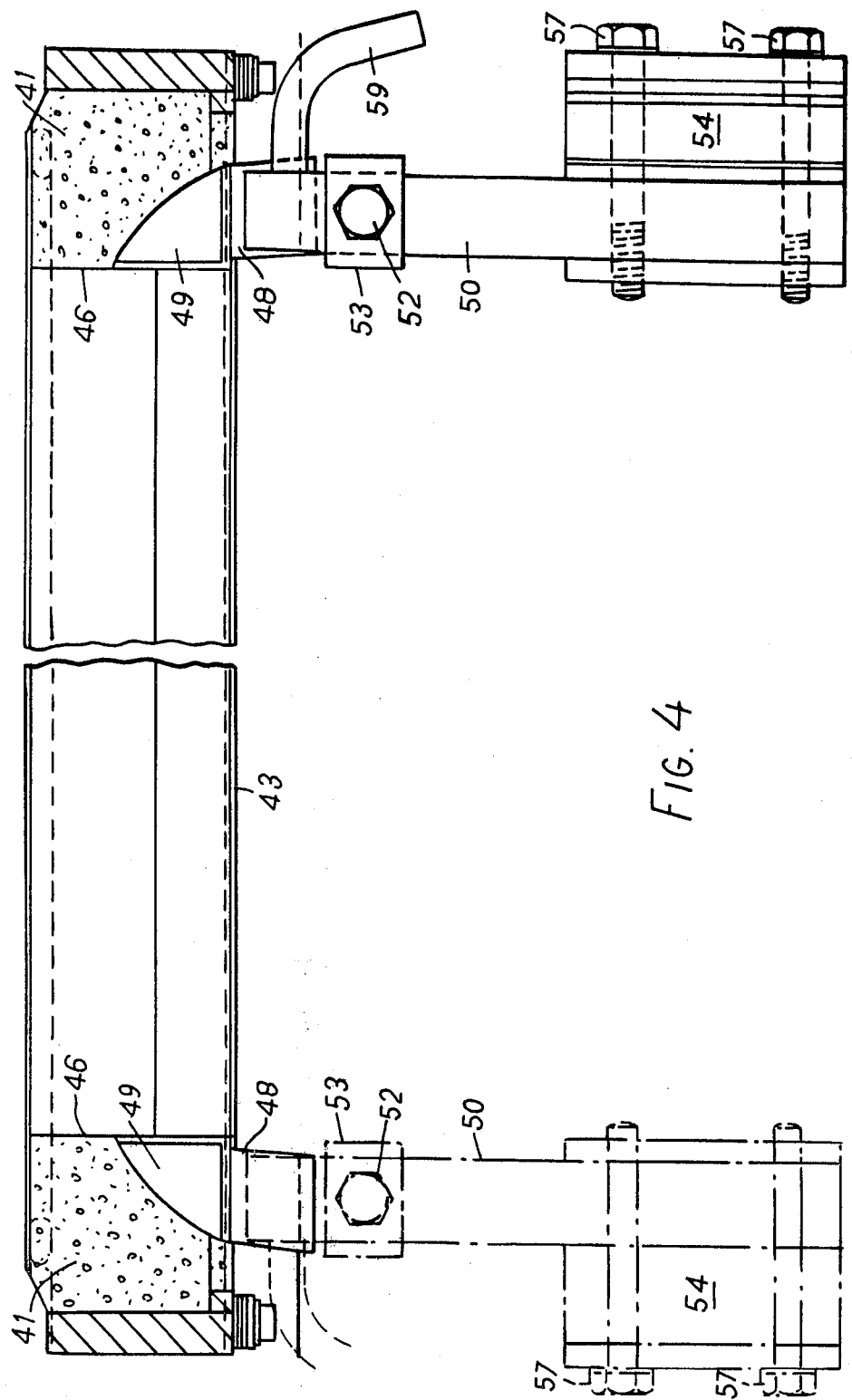

METHOD AND APPARATUS FOR THE PRODUCTION OF GLASS FIBRES

This invention relates to apparatus for the manufacture of glass fibres by a process which involves the attenuation of cones of molten glass formed by a bushing. The term bushing in this present context means a metal plate or tray provided with a plurality of orifices through which molten glass can flow to form the cones for subsequent attenuation. One face of the bushing (the face opposite that on which in use, the cones are formed) may communicate with a feed channel from a glass production furnace, or it may constitute part of a chamber in which glass in the form of marbles or cullet is melted.

In both cases, it is usual to heat the bushing by passing an electric current through it. Because the bushing is of platinum, a platinum alloy or other high temperature resistant metal and of relatively substantial construction, the current necessary to attain the desired bushing temperature is very considerable.

For this reason, power is fed to each end of the bushing through a water cooled copper clamp, the current being controlled by adjusting the "bite" of these clamps. The "bite" is simply the extent of clamp overlap with the material of the bushing, so that the adjustment is somewhat imprecise.

Where the bushing is both relatively large and has a large number of orifices, say 1000 or more the current distribution in the bushing is considerably modified by the presence of the orifices. It may also be modified by irregular heat losses/gains such as may be caused by refractory faults and/or defects, current flow variations due to non-uniform weld thicknesses, or slight variations in the thickness and/or length of the metal of the bushing in any particular part thereof. One result of this may be that the heat generated is not distributed uniformly over the face of the bushing and localised overheating may occur. This is highly undesirable, because not only does it lead to distortion of the bushing, but also it leads to variations in the viscosity of the glass. This is a serious problem because viscosity is a critical parameter in any fibre-forming process based on use of a bushing, as has been discussed in numerous patent specifications. U.S. Pat. No. 3,512,948 contains an extensive discussion of the problems of producing glass fibres by means of an electrically heated bushing. Other U.S. Pat. Nos. such as Nos. 3,150,949 and 3,256,078 discuss the effects of melt viscosity on fibre formation at a bushing. However, only U.S. Pat. No. 3,512,948 attempts to improve the process by modifying the manner of feeding electric power to the bushing, the particular modification proposed being the establishment of an equipotential line in the end wall region of the bushing by means of selected terminal configurations.

According to the present invention, a bushing is provided with at least two spaced-apart electrical terminals at each end thereof, together with adjustable connector means for each of said terminals, so that in use the current flowing through each of said terminals can be independently adjusted.

By making provision for more than one independently adjustable terminal at each end of the bushing, it is no longer necessary to operate with an equal potential over the whole of each end wall region of the bushing. Consequently current flow patterns may be modified to counteract the asymmetric heating effects caused by the presence of large numbers of orifices arranged in groups across the bushing. The current flow patterns may also be modified to compensate for irregular heat losses or gains, as referred to earlier. In particular, by providing such terminals towards the corner regions of the bushing, much better control of heating in these corner regions can be achieved. The number of terminals necessary will depend on the width of the end region of the bushing. However, in the interests of current flow symmetry, it may be desirable to use the same number of terminals at each end of the bushing.

It should be appreciated that the primary objective in glass fibre production is uniformity of the product; this does not necessarily result from the achievement of uniform current flow in the bushing, as was previously believed. The problem is rather one of selectively compensating for heat gains/losses which may be and usually are asymmetrically distributed. Furthermore, the molten glass within the body of the bushing and adjacent the forehearth is relatively viscous and may exhibit a degree of inhomogeneity which is not capable of rectification by passage through a uniformly heated bushing. The present invention provides the flexibility previously lacking in this particular regard.

The invention further comprises a process for the production of glass fibres by flowing molten glass through the orifices of a bushing, said process including the steps of electrically heating said bushing by passing an electric current through it by means of at least two spaced-apart terminals at each end thereof, and independently adjusting the current flowing through each of said terminals whereby said bushing yields glass fibres of substantially uniform diameter.

Figure 2:
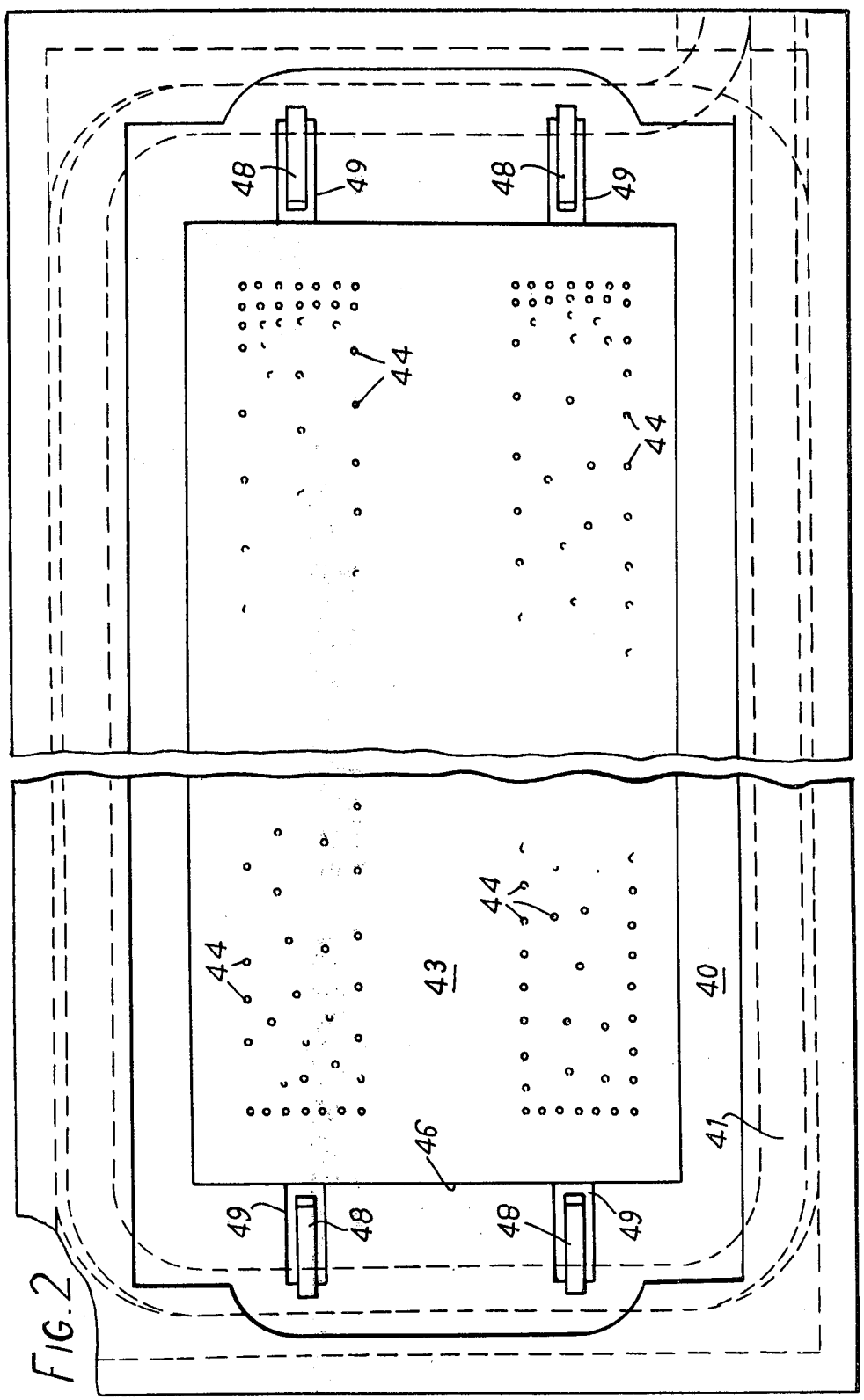
Figure 3:
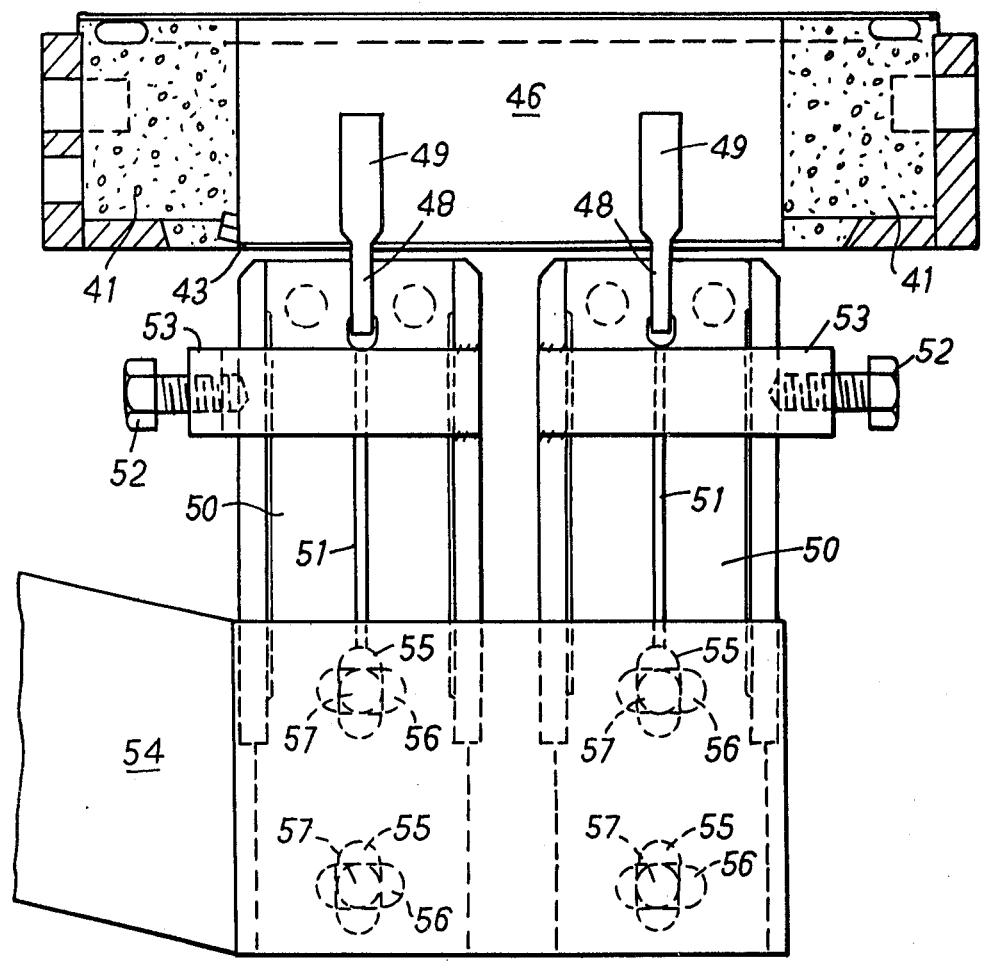

In order that the invention be better understood, preferred embodiments of it will now be described by way of example with reference to the accompanying drawings in which:

FIG. 1 is a schematic side view, partly in section, illustrating glass fibre production by means of a bushing, FIG. 2 is a plan view of the underside of a bushing according to the invention, FIG. 3 is end view of the bushing of FIG. 2, also showing the means of supplying electrical current thereto, and FIG. 4 is a side view of the bushing, of FIG. 3, including the current supply means.

Firstly, referring to FIG. 1, the glass fibre production process using a bushing takes the form of (a) melting the glass (b) forming a plurality of cones of molten glass by flowing the latter through the orifices of the bushing (c) rapidly attenuating the cones into fibres prior to and during solidification of the glass (d) applying a liquid size or dressing to the fibres and (e) collecting them as a strand for subsequent processing into staple fibers, or as continuous filaments. FIG. 1 shows a bushing 10 in the form of a shallow platinum alloy tray supported by a refractory assembly 11, which encloses a feed channel 12 containing molten glass. In the interest of simplicity further details of the feed channel and associated furnace are not shown. The bushing 10 has a plurality of orifices 13 through each of which molten glass flows to form a cone on the underside of the bushing. Filaments 14 are produced by rapid attenuation of these cones by a winding head 17, the filaments being dressed with a liquid size composition by tangential passage over a roller applicator 15 prior to gathering into a single strand 22 by a guide 16, a traverse mechanism 18 being used to build up a strand package on the winding head 17.

The bushing 10 has a terminal 19 at each end, and electric current is passed through the bushing between said terminals from a high current power source. The power is supplied through copper bus bars 21, which are connected to the respective terminals 19 by adjustable clamps 20. These clamps provide a means of adjusting the current flow in the bushing so as to maintain the glass temperature in the fibre-forming range.

The process thus far described is entirely conventional. FIGS. 2, 3 and 4 illustrate the present invention and accordingly, different reference numerals are used, even though certain parts are common to all four figures. Referring to FIGS. 2, 3 and 4, a bushing 40 is supported by a refractory assembly 41. The bushing is in the form of a shallow tray having a flat floor or base portion 43 provided with 2000 orifices 44 arranged in groups. The opposed end walls 46 of the bushing are each provided with a pair of terminal lugs 49 of platinum, welded onto the end walls. To connect these lugs to an electric power source, the independently adjustable clamps shown only in FIGS. 3 and 4 are employed. Referring to these two figures and to FIG. 3 in particular, each clamp comprises a body portion 50 slit longitudinally at 51 to form a pair of jaws which grip a waisted portion 48 of the associated terminal lug 49 under the influence of a clamping bolt 52. This bolt 52 passes through a screw-threaded bore in a strap 53 welded to the opposite jaw, so that tightening the bolt draws the jaws together. The lower part of the body 50 at the base of the slit 51 is bolted to a copper bus bar 54. Elongated bolt holes 55, 56 are provided for the bolts 57 so that the precise position of the clamps can be adjusted over a small range without moving the bus bar itself. One set of elongations is directed so that variations in the widthwise spacing of the terminal lugs can be accommodated if the bushing has to be changed. The other set of elongations is directed so that the "bite", which is the amount of overlap of the jaws onto the waisted portion 48 of the terminal lug, can be adjusted, again without moving the bus bar itself. It will be understood that the clamp arrangements at each end of the bushing are identical, although only one end is shown in detail. It will also be understood that in the interests of simplicity the cooling system for the clamps has been omitted because it is conventional, taking the form of passages in the clamps through which cooling water is circulated when the bushing is in use. A pipe for such cooling water is shown at 58, purely by way of illustration. In operation of the bushing of FIGS. 2, 3 and 4 the initial settings of the four clamps is largely a matter for experiment, particularly as the operation of any bushing involves a large number of variables. However, because the "bite" of all four clamps can be independently adjusted, one can adjust one or more of the clamps to reduce or increase current flow in a desired region of the bushing floor 43. As the bushing floor normally operates at red heat, it may be possible to detect visually regions of under/overheating, although of course, pyrometry can also be used for this purpose. Extremely high currents are not easy to monitor directly, but in the present case, the relative currents in the pairs of clamps can also be assessed by measuring the potential between them, thereby obtaining at least an indication of the way the current flow is shared between them and how it is distributed in the adjacent regions of the bushing floor. The object of the adjustment is, of course, not necessarily merely the achievement of absolute uniformity of heating of the bushing floor. Much more significant is the control of product uniformity made feasible by the degree of control afforded by the invention.

There is no reason why further terminal lugs 49 should not be provided, spaced across the end walls 46 and each with its own adjustable clamp connection to a common bus bar. This would be especially useful for a wide bushing, where the conventional singly-adjustable clamp offers little or no control of current distribution, only of the total curent flowing into/out of the bushing at one point.

I claim:

1. In an apparatus for producing glass fibres by flowing a plurality of streams of molten glass through an electrically-heated bushing comprising a metal plate with a plurality of orifices therein, together with means for flowing an electric current through said plate to heat it, the improvement wherein the bushing is provided with at least two electrical terminals spaced apart widthwise of the bushing at each end thereof, together with individually adjustable connector means for each of said terminals, whereby in use the current flowing through each of said terminals is independently adjustable.

2. The apparatus of claim 1, wherein each of said adjustable connector means comprises clamping means engaged with one of said terminals to electrically connect said terminal to a bus bar communicating with an electrical power source, and the overlap of said clamping means onto said terminal is adjustable.

3. The apparatus of claim 1, wherein the bushing is provided with upwards of 1000 orifices and at least two electrical terminals at each end thereof spaced apart widthwise of the bushing, together with adjustable connector means for each of said terminals, each of said connector means comprising a clamp electrically connecting the associated terminal to a bus bar source of electrical power, whereby the current through each of said clamps is a function of the area of clamp contact with said terminal and is adjusted by varying the said contact area.

4. In a process for the production of glass fibres by flowing molten glass through orifices in an electrically heated bushing, the improvement which comprises heating said bushing by passing an electric current through it by means of at least two (spaced-apart) terminals spaced apart widthwise of the bushing at each end thereof, and independently adjusting the current flowing through each of said terminals, whereby the current distribution in the bushing and the heating effect thereof is adjusted so that said bushing yields glass fibres of substantially uniform diameter.

5. The process of claim 4, wherein said step of independently adjusting the current flow through each of said terminals is effected by adjusting the area of contact between each of said terminals and an associated clamping member adjustably connecting said terminal to a source of electrical power for said bushing.

* * * * *